United States Patent

Takada et al.

[11] Patent Number: 5,833,916
[45] Date of Patent: Nov. 10, 1998

[54] MOLDED ARTICLE CONTAINING A DECORATIVE FILM AND A PROCESS FOR PREPARING THE SAME

[75] Inventors: Ryouichi Takada, Hashima; Hiroshi Watarai; Toshimichi Kawata, both of Ichinomiya; Daijou Ikeda, Kasugai; Takashi Mita, Nagoya, all of Japan

[73] Assignee: Toyoda Gosei Co., Ltd., Aichi-ken, Japan

[21] Appl. No.: 701,127

[22] Filed: Aug. 21, 1996

[30] Foreign Application Priority Data

Aug. 25, 1995 [JP] Japan .................................. 7-217542

[51] Int. Cl.⁶ ................................ C08J 3/28; C08F 2/50; B29C 35/08
[52] U.S. Cl. .......................... 264/494; 264/266; 264/269; 264/512; 522/121; 522/149
[58] Field of Search ...................... 522/121, 120, 522/122, 149, 153, 154; 264/101, 134, 135, 447, 494, 266, 269, 512

[56] References Cited

U.S. PATENT DOCUMENTS

| | | | |
|---|---|---|---|
| 4,012,559 | 3/1977 | Fujioka et al. | 522/121 |
| 4,016,235 | 4/1977 | Ferro | 264/135 |
| 4,478,771 | 10/1984 | Schreiber | 264/22 |
| 4,904,737 | 2/1990 | Sato et al. | 522/121 |
| 4,959,189 | 9/1990 | Rohrbacher et al. | 264/135 |
| 5,256,446 | 10/1993 | Bogen | 522/121 |

FOREIGN PATENT DOCUMENTS 7-323   1/1995   Japan .

*Primary Examiner*—Susan W. Berman
*Attorney, Agent, or Firm*—Cushman Darby & Cushman IP Group of Pillsbury Madison & Sutro LLP

[57] ABSTRACT

A molded article containing an outer decorative film and a support, and a method and composition for making the same are disclosed. The outer film has a decorative layer and a protective layer, the protective layer being formed from a photopolymerizable resin composition. In an uncured state, the composition includes (a) an acrylic copolymer containing a backbone and at least one side chain linked to the backbone, the at least one side group having at least one (meth)acryloyl group, the backbone having a glass transition temperature of about 40° C. to about 120° C. and a weight-average molecular weight of about 10,000 to about 200,000; (b) a compound other than the copolymer (a), the compound having at least three (meth)acryloyl groups; and a photopolymerization initiator. The at least one (meth)acryloyl group is preferably linked to the backbone by a reacted glycidyl group.

1 Claim, 5 Drawing Sheets

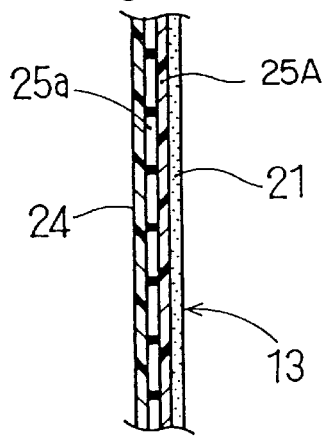
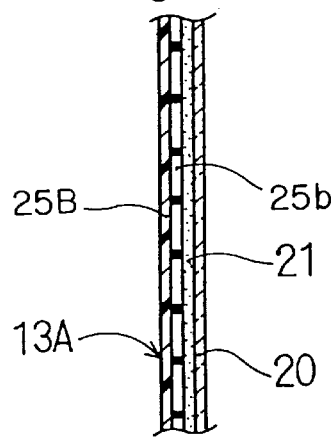
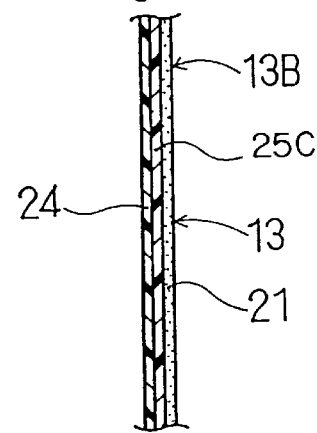
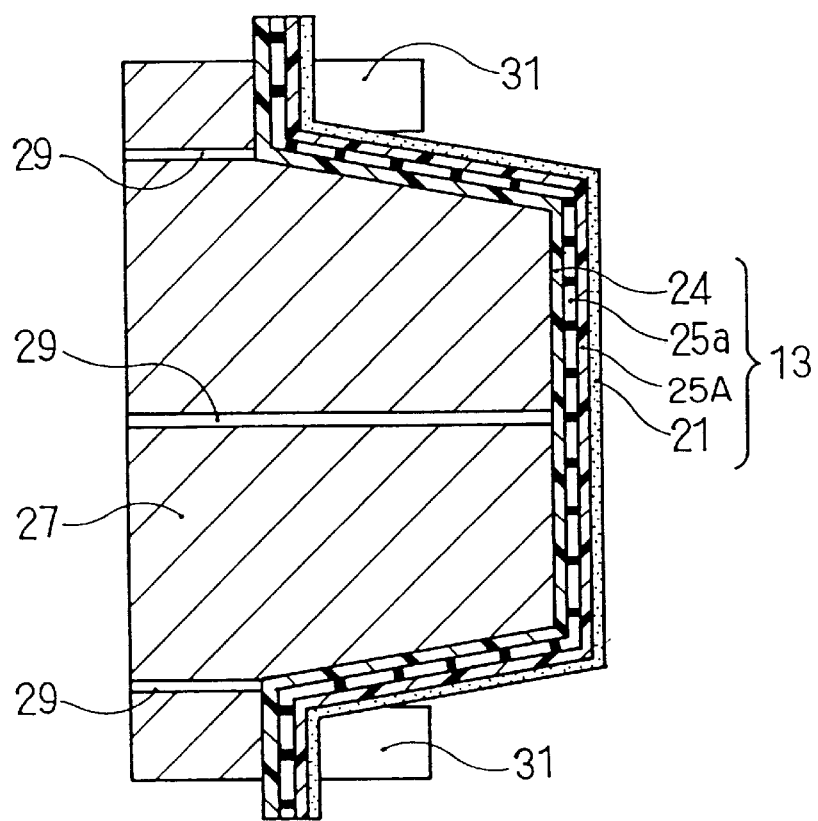

MOLDED ARTICLE CONTAINING A DECORATIVE FILM AND A PROCESS FOR PREPARING THE SAME

BACKGROUND OF THE INVENTION

1. Field of the Invention

This present invention relates to a molded article, and a composition and process for producing the same. In particular, the molded article includes an in-mold decorative film disposed on a thermoplastic resin-based support, the film having a protective layer formulated from a photopolymerizable resin composition and a decorative layer.

The molded article of the present invention is particularly suitable for producing various interior or exterior decorative accessories of a motor vehicle such as, by way of example, a center cluster panel, a console upper panel, a wheel cap, and a pillar garnish outer. The molded article of the present invention satisfies commercial demands, which require that these decorative accessories have excellent surface properties, including for example wear resistance, scratch resistance, surface heat-resistance, weatherability, light-resistance, chipping resistance, and the like.

2. Description of Related Art

In-mold decorative films can be employed for imparting a wood-grain pattern to the surface of, for example, a center cluster panel 11 having a three-dimensional shape, such as that shown in FIG. 1.

Conventional techniques for producing a molded article having a decorative film with a deep-drawing shape, such as exhibited by a center cluster panel, require that the decorative film be soft and thin and conformable to the desired shape of the finished article. The softness and thinness of the film, however, provides the molded product with insufficient surface properties such as wear resistance, scratch resistance, surface heat resistance, weatherability, light resistance, and chipping resistance.

Due to the insufficient surface properties of the article realized by in-mold techniques, it has become customary to apply the decorative film to the molded support by alternative techniques, such as painting the decorative film on the molded support subsequent to removal of the support from the mold cavity. The post-mold painting, however, is disadvantageous insofar as it requires additional time and labor.

A process with an objective of overcoming these problems is disclosed in Japanese Patent Publication No. Hei 7-323. This process comprises the steps of (1) providing a printed or decorative film having on an upper surface a protective layer made from a photopolymerizable resin composition, the film being adaptable to conform to the shape of a molded product, and (2) photocuring (or polymerizing) the resin composition forming the protective layer after releasing the molded product from the mold.

The inventors of the present invention tested the protective layer for the physical properties of its surface in accordance with the description of the examples in the Japanese patent publication. The results of the tests indicated that these films did not satisfy increasing commercial demands with respect to surface properties, particularly with respect to wear resistance, scratch resistance, solvent resistance and chemical resistance.

SUMMARY OF THE INVENTION

It is an object of this invention to solve the aforementioned problems associated with the related art by providing a molded article that includes a support molded on an outer decorative film, the film having a protective layer and a decorative layer that exhibits excellent surface properties, thereby obviating the need for post-mold painting of the support - - - that is, applying the outer film after releasing the support from the mold cavity.

It is another object of the present invention to provide a molded article that displays excellent surface properties, particularly with respect to wear resistance, scratch resistance, solvent resistance and chemical resistance.

It is yet another object of the present invention to provide a process for preparing the aforementioned molded article.

It is a further object of the present invention to provide a composition which is suitable for preparing the protective layer of the aforementioned molded article.

These and other objects are achieved in accordance with an embodiment of the present invention which involves a process in which an outer film having a protective layer formed of photopolymerizable resin composition and a decorative layer are introduced into a mold cavity. According to this process, a thermoplastic resin composition is then introduced into the cavity to make the support of the molded article. According to a preferred embodiment, after the outer film and support are released from the mold, the photopolymerizable resin composition is cured or polymerized by exposure to light.

The photopolymerizable resin composition in an uncured state includes at least the following:

(a) a modified acrylic copolymer including a main chain (also referred to herein as a backbone or principal chain) and at least one (meth)acryloyl side group, said modified acrylic copolymer being synthesized by copolymerizing (i) a glycidyl (meth)acrylate monomer having an epoxy group and (ii) at least one other copolymerizable monomer, and modifying a resulting copolymer with (meth)acrylic acid by reacting the epoxy group with a carboxyl group of the (meth)acrylic acid, the main chain having a glass transition temperature ($T_g$) of about 40° C. to about 120° C. and a weight-average molecular weight (Mw) of about 10,000 to about 200,000;

(b) a compound having at least three (meth)acryloyl groups, the compound not being the modified acrylic copolymer (a); and (c) a photopolymerization initiator.

Preferably, the glycidyl group is employed as a reactant for linking the (meth)acryloyl group to the main chain.

The process of this invention facilitates the production of the molded article by obviating the need for post mold painting. The molded article displays excellent surface properties, particularly scratch and chemical resistance. Furthermore, the process is applicable for producing molded articles having a deep drawing or a complicated shape, since the photopolymerizable resin composition can form a protective layer which is sufficiently thick and yet easily adaptable to the shape of the molded article.

The process also eliminates the need for any special deburring work, since the decorative film can be cut in mold by raising the mold clamping pressure prior to mold releasing.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings:

FIGS. 2A, 2B, and 2C are fragmentary cross-sectional views of different embodiments of the decorative film employed in the process of the present invention;

FIG. 3 is a schematic cross-sectional view showing a method for preliminary shaping the decorative film in accordance with an embodiment of the process of the present invention;

DESCRIPTION OF THE PREFERRED EMBODIMENTS

Figure 1:
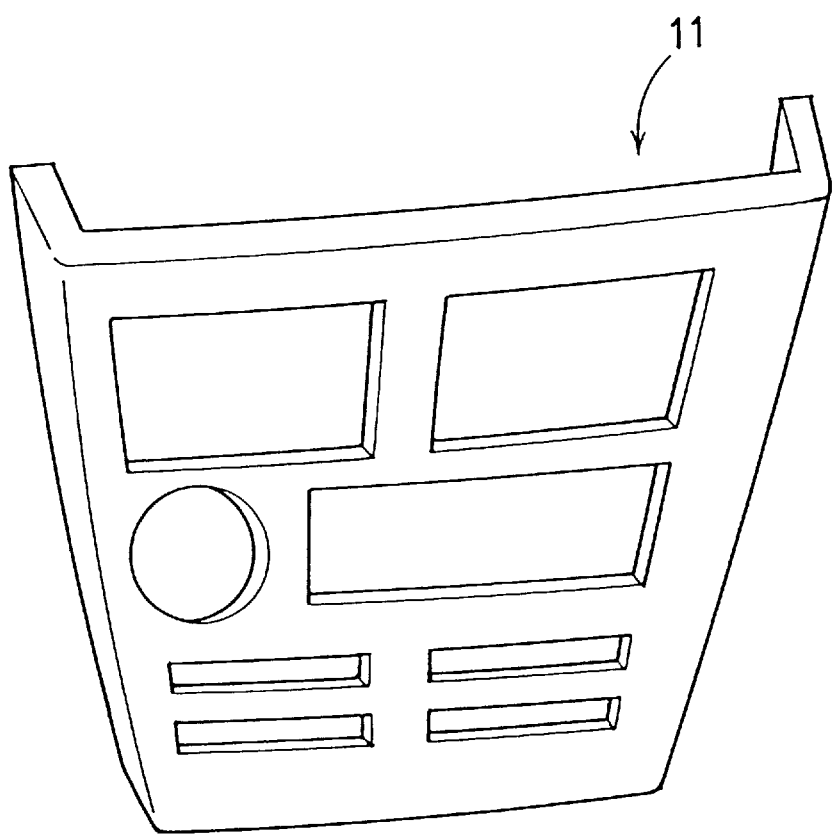
FIG. 1 is a perspective view of a center cluster panel, and is exemplary of the type of molded product which can be produced by the process of the present invention.

Detailed description of this invention is provided hereinafter, with reference to the drawings. In the following description, the amounts of materials are designated "by weight" unless indicated otherwise. Further, identical parts are designated by the same reference numerals throughout the drawings.

Figure 4:
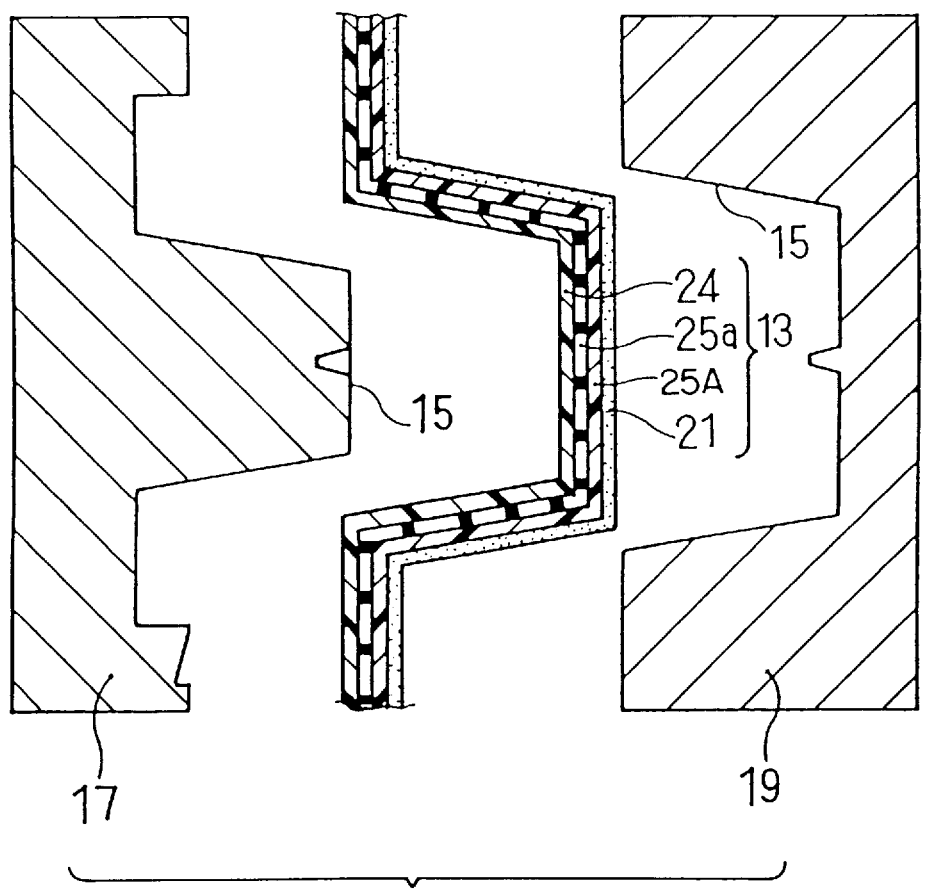
FIG. 4 is a schematic cross-sectional view showing the decorative film being introduced into a mold cavity.
Figure 6:
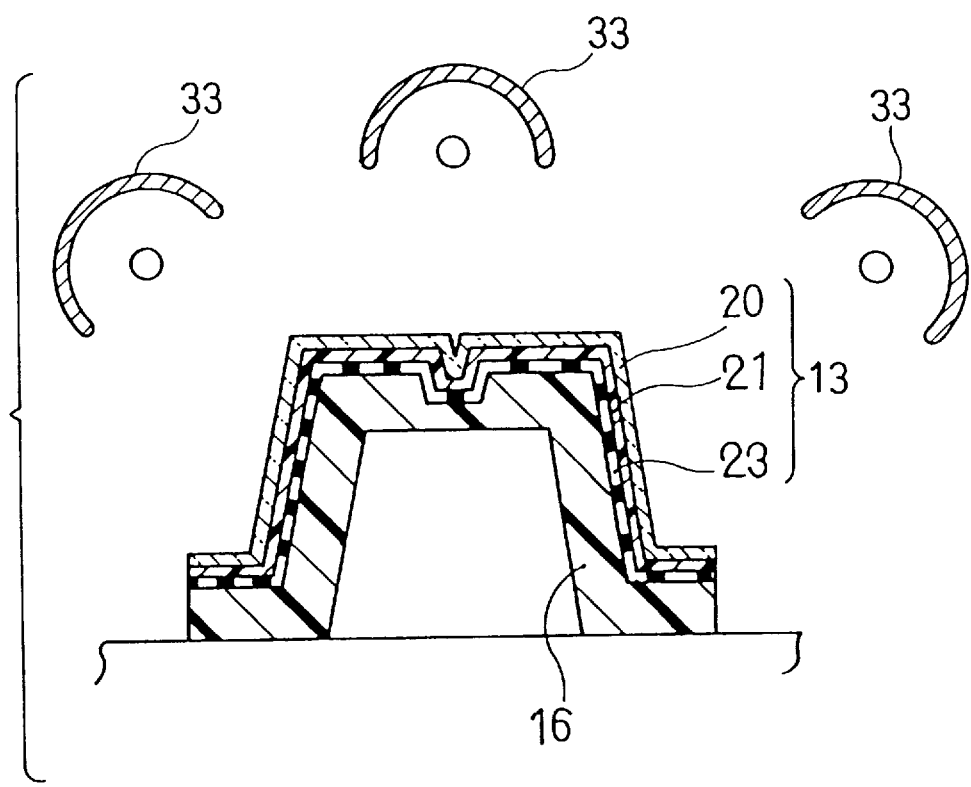
FIG. 6 is a schematic cross-sectional view showing an embodiment of the process of the present invention in which the photopolymerizable resin composition of the protective layer is subjected to ultraviolet curing after mold releasing.

According to one embodiment of the present invention, the molded article is prepared by introducing an outer decorative film 13 in a mold cavity 15, which is defined by and between a movable mold portion (male) 17 and a stationary mold portion (female) 19, as shown in FIG. 4. Then, a thermoplastic resin is introduced into a portion of the mold cavity 15 defined between the decorative film 13 and one of the mold portions 17 or 19 to prepare a support 16 of the molded article, as shown in FIG. 6.

Exemplary thermoplastic resins which can be employed for preparing the support include acrylonitrile-butadiene-styrene (ABS), acrylonitrile-styrene (AS), a polyethylene, a polypropylene, a polyacetal, a thermoplastic urethane elastomer (TPU), a polyamide (PA), a polyvinyl chloride (PVC), a polymethyl methacrylate (PMMA), a saturated polyester such as a polybutylene terephthalate (PBT) or a polyethylene terephthalate (PET), a polyphenylene oxide (PPO), a polycarbonate (PC), and an combination of the aforementioned resins, such as a PC/ABS, a PC/PBT, a PBT/ABS, or a PPO/PA resin.

The molding material is usually charged into the mold cavity by injection; however, transfer, compression or blow molding can also be employed for charging the molding material.

The molding material and the material forming the inner surface of the decorative film, with which the molding material is brought into contact, are usually selected so as to undergo fusion bonding (i.e., substantially no cross-linking at the interface of the decorative film and support) by the heat of the molding material which is fed into the mold cavity. However, an adhesive layer can be applied to an inner surface of the decorative film in order to improve the bond between the support and outer film. The adhesive layer is particular appropriate in instances in which the heat supplied from the molding material does not promote sufficient fusion between the support and outer film.

As shown in FIGS. 2A and 4, according to one embodiment of the present invention the outer film 13 comprises a main body 25A (also referred to as the decorative layer) having an inner (i.e., back) surface with a printed face 25a, a protective layer 21 formed from a photopolymerizable resin composition on an outer (i.e., front) surface of the main body 25A, and an adhesive layer 24 formed on an inner (i.e., back) surface of the printed face of the main body 25A.

As shown in FIG. 2B, according to another embodiment a decorative film 13A comprises a main body 25B having an outer (i.e., front) surface with a printed face 25b, a protective layer 21 formed from a photopolymerizable resin composition on an outer surface of the printed face 25b of the main body 25B, and a laminated film 20 bonded to the outer surface of the protective layer 21. The laminated film 20 is employed for facilitating the removal of the decorative film 13A from the mold without staining. However, the laminated film 20 is not essential, since the photopolymerizable resin composition dries quickly.

Yet another embodiment of a decorative film 13B is depicted in FIG. 2C. The decorative film 13B comprises a main body 25C having a dark tone, a protective layer 21 formed on an outer surface of the main body 25C, and an adhesive layer 24 (e.g., a layer of a hot-melt adhesive) formed on an inner surface of the main body 25C.

The main body 25A, 25B, or 25C can be a film of a soft thermoplastic resin, such as, by way of example, PMMA, PET or PVC. The laminated film 20 also can be of a soft thermoplastic resin, such as PET or PVC.

The protective layer 21 is prepared from a photopolymerizable resin composition, the resin composition in an uncured state includes at least the following:

(a) a modified acrylic copolymer containing a backbone and at least one side chain linked to the backbone, the side chain having at least one (meth)acryloyl group, the backbone having a glass transition temperature ($T_g$) in the range of about 40° C. to about 120° C., and preferably about 45° C. to about 80° C., and a weight-average molecular weight (Mw) in the range of about 10,000 to about 200,000, preferably about 30,000 to about 100,000, and more preferably about 45,000 to about 80,000;

(b) a compound having at least three (meth)acryloyl groups, the compound being different than the above acrylic copolymer (a); and (c) a photopolymerization initiator.

As referred to herein, the term "(meth)acryloyl group" encompasses an acryloyl group, $CH_2=CHCO-$, or a methacryloyl group, $CH_2=C(CH_3)CO-$. The "glass transition temperature" is determined by a thermomechanical method, and the "weight-average molecular weight" is determined by gel permeation chromatography (GPC).

The glass transition temperature of about 40° C. to about 120° C. as specified for the principal chain of the acrylic copolymer (a) is selected to ensure practically acceptable levels of mold release properties and surface properties of a cured film. The weight-average molecular weight of about 10,000 to about 200,000 is selected to ensure practical and acceptable levels of mold release properties, weatherability, and durability.

The acrylic copolymer (a) and the compound (b) are preferably employed in a mixing ratio, (a)/(b) of about 40/60 to about 60/40 so that excellent results may be obtained with respect to the dryness, crosslinkability, and softening resistance of the protective layer 21 or the printed layer 25A at the time of injection molding, and the mold release properties and mar resistance thereof.

The acrylic copolymer (a) contains at least one (meth) acryloyl group linked to the backbone in a side chain. A glycidyl group is preferably employed for preparing the linkage between the (meth)acryloyl group and the backbone. Glycidyl (meth)acrylate is an example of a copolymerizable monomer having a glycidyl group employed for linking a (meth)acryloyl group to the backbone of the copolymer.

Examples of the other copolymerizable monomers which can be employed for making a (meth)acrylic copolymer are methyl, ethyl, n-propyl, isopropyl, n-butyl, isobutyl, t-butyl, 2-ethylhexyl, lauryl, dodecyl or stearyl (meth)acrylate, or other (meth)acrylic esters. Other examples of vinyl monomers which are copolymerizable with the glycidyl (meth) acrylic monomer are styrene, vinyltoluene, or other aromatic vinyl compounds, acrylonitrile, and vinyl acetate or propionate.

A compound having a carboxyl group, such as, for example, (meth)acrylic acid, is reactive with the glycidyl group.

The modified acrylic copolymer can be synthesized by copolymerizing (i) a glycidyl (meth)acrylate monomer having an epoxy group and (ii) at least one other copolymerizable monomer via ordinary solution polymerization and thereafter modifying the resulting copolymer with (meth) acrylic acid. The reaction between the epoxy group and a carboxyl group of the (meth)acrylic acid forms the modified acrylic copolymer with a (meth)acryloyl side group.

For these reactions, it is possible to use a polymerization initiator, or inhibitor, a catalyst, or anything else that is usually employed for the same purposes.

Polyol (meth)acrylate preferably is selected as the compound (b), which has at least three (meth)acryloyl groups. Polyol (meth)acrylate can be prepared by reacting a polyol, such as trimethylolpropane, pentaerythritol, or dipentaerythritol, with (meth)acrylic acid. Other suitable compounds (b) include: polyester poly(meth)acrylates, which can be obtained by the reaction between polyesters formed from polybasic acids (such as phthalic and adipic acids), polyhydric alcohols (such as ethylene glycol and butanediols), and (meth)acrylic acid compounds; epoxy poly(meth)acrylates, which can be obtained by the reaction of epoxy resins and (meth)acrylic acid compounds; polysiloxane poly(meth)acrylates, which can be obtained by the reaction of polysiloxanes and (meth)acrylic acid compounds; and polyamide poly(meth)acrylates, which can be obtained by the reaction of polyamides and (meth)acrylic acid compounds. It is further possible to use urethane acrylates obtained by reacting (meth)acrylates having hydroxyl groups with triisocyanates, or polyisocyanates such as polymers of di(or tri)isocyanates or addition products thereof with polyols.

The photopolymerization initiator (c) preferably is selected in an amount of about 0.1 to about 10 parts per 100 parts of the components (a) and (b) combined. A range of about 1 to about 5 parts is particularly preferred to ensure the formation of a film having excellent properties, including curability and mar resistance. The use of less than about 0.1 part of the initiator can result in a film which is too low in curability and which exhibits poor mar resistance. Preferred examples of initiators include benzoyl alkyl ethers, acylphosphine oxide, oxime esters, and bisimidazole.

The photopolymerizable resin composition may further contain additives, such as a color pigment, a slip agent, an anti-foaming agent, an anti-repelling agent, a wetting agent, an anti-setting agent, an anti-sagging agent, an ultraviolet absorber, an oxidation inhibitor, a polymerization inhibitor, and a coupling agent, alone or in any combination thereof. A volatile organic solvent also can be employed to control the viscosity of the composition.

The outer decorative film 13 is preferably subjected to preliminary shaping before it is placed in the mold cavity. The preliminary shaping facilitates the adaptation of the film 13 to the uneven surface of the mold cavity, and also diminishes the likelihood of any cracking or like damage occurring to the film surface that would result from its sudden deformation. The preliminary shaping can be accomplished by employing a die 27, chucking the film 13 at 31, and evacuating the space between the film 13 and the die 27 through suction holes 29, as shown in FIG. 3. Alternatively or in addition to the evacuation through the suction holes 29, compressed air can be blown against the film 13 to press the film 13 against the die 27.

Figure 5A:
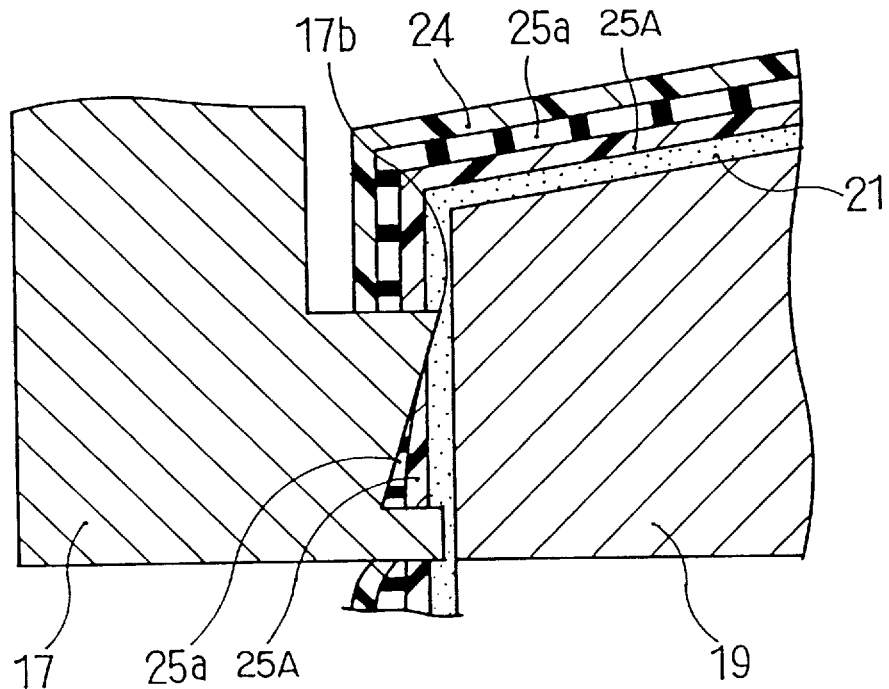
FIGS. 5A and 5B are fragmentary enlarged cross-sectional views showing the decorative film of FIG. 2A being deburred and the decorative film of FIG. 2B having been deburred, respectively, in the mold cavity depicted in FIG. 4.
Figure 5B:
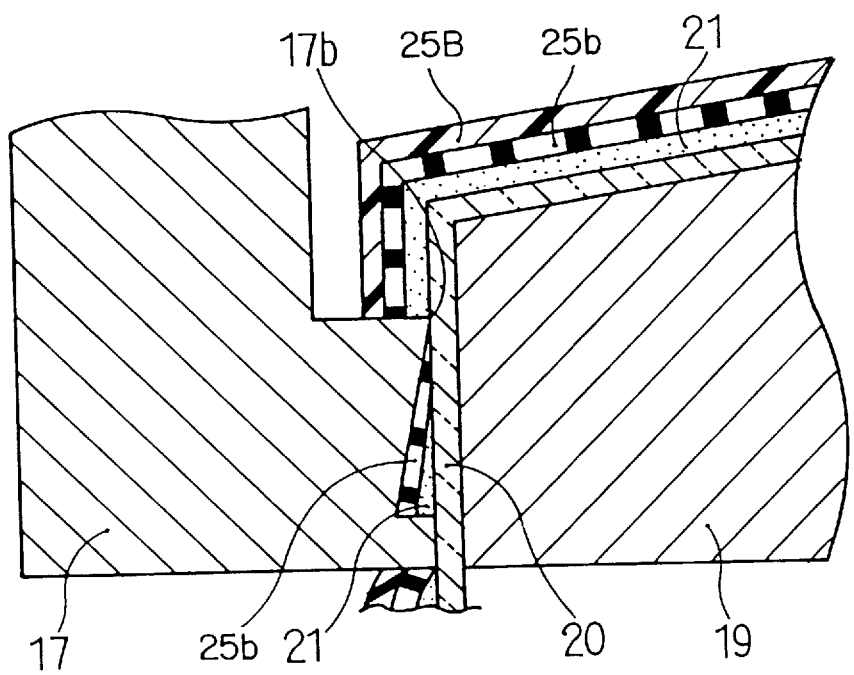

The mold clamping pressure is preferably raised for an instant immediately before the removal of the molded article from the mold to cut the decorative film 13 and thereby eliminate the need to perform any subsequent deburring work. In this embodiment, the movable mold portion 17 is equipped with a burr cutting device 17b formed in the parting plane of the mold and defining a relief space 17a around the molded product, as shown in FIG. 5A. When the decorative film 13A including the laminated film 20 is employed, the laminated film 20 can be left uncut, as shown in FIG. 5B, in order to improve the burr cutting efficiency and mold releasing properties.

Generally, after removal of the molded article from the mold, the article is exposed to light for the curing or polymerization of the photopolymerizable resin composition forming the protective layer 21 of the outer film 13. As shown in FIG. 6, ultraviolet lamps 33 can be employed for exposing the protective layer to light. The curing time is usually in the range of about 1 second to about 60 seconds. The laminated film 20 may be removed before curing, or thereafter.

According to the process of the present invention, it is easy to make a molded article having excellent physical properties, including wear, mar and heat resistances on its decorated surface, since the decorated surface is protected by the photo-cured (or polymerized) resin layer.

A molded article having an outer decorative film and a process and composition for producing the article are disclosed in the priority application, Japanese Patent Application No. Hei 7-217542, filed in Japan on Aug. 25, 1995, the complete disclosure of which is incorporated herein by reference.

EXAMPLES

Description will now be made of a number of non-limiting examples and comparative examples in which tests were conducted to ascertain the advantages of this invention.

Description will first be made of the preparation of the acrylic copolymers employed in the examples and comparative examples.

(1) Preparation of modified acrylic copolymer (a-1) having an acryloyl group:

Into a flask equipped with a stirrer, a temperature controller, and a condenser was placed 100 parts of methyl ethyl ketone (MEK) as a solvent, and the temperature of the solvent was raised to 80° C. under stirring. A monomer solution was prepared by dissolving 0.5 part of azobisisobutyronitrile as a radical polymerization initiator in 100 parts of acrylic monomers consisting of 15 parts of n-butyl methacrylate, 55 parts of methyl methacrylate, and 30 parts of glycidyl methacrylate. The monomer solution was dropped continuously for 4 hours into the flask through a dropping funnel. As the monomer solution was dropped, an amount of the polymerization initiator was added to the monomer solution to achieve a polymerization rate of 100%. After the complement of the polymerization for an acrylic copolymer, an amount of MEK was added to obtain an about 30 wt % solution of the acrylic copolymer. The acrylic copolymer solution was, then, supplied with 0.1 part of hydroquinone (HQ) as a polymerization inhibitor and 2 parts of triethylamine (TEA) as a synthesizing catalyst, and was reacted with 15.2 parts of acrylic acid as a monomer for forming the acryloyl group side chain, whereby a modified acrylic copolymer (a-1) having an acryloyl group was obtained.

The modified acrylic copolymer (a-1) had a $T_g$ of 72° C. in the main chain and a Mw of 78,000.

(2) Preparation of a modified acrylic copolymer (a-2) having an acryloyl group:

Another modified acrylic copolymer (a-2) having an acryloyl group introduced therein was synthesized by repeating the process as described at (1), except that 50 parts of n-butyl methacrylate, 35 parts of methyl methacrylate and 15 parts of glycidyl methacrylate were employed as 100 parts of acrylic monomers, 1.0 part of azobisisobutyronitrile as the polymerization initiator, and 8 parts of acrylic acid as the monomer for forming the acryloyl group side chain. The backbone of the modified acrylic copolymer (a-2) had a $T_g$ of 50° C. and a Mw of 49,000.

(3) Unmodified Acrylic copolymer A:

An unmodified acrylic copolymer A not having any acryloyl group linked thereto was synthesized by repeating the process as described at (1), except that 100 parts of toluene was used as the solvent, 15 parts of n-butyl methacrylate, 55 parts of methyl methacrylate, and 30 parts of 4-hydroxybutyl acrylate were employed as the 100 parts of acrylic monomers. In addition, 1 part of azobisisobutyronitrile was employed as the polymerization initiator, while MEK was added to achieve an about 40 wt % solution of the acrylic copolymer A. The backbone of the copolymer A had a $T_g$ of 60° C. and a Mw of 20,000.

Examples 1 to 3 and Comparative Examples 1 to 4:

Photopolymerizable resin compositions were prepared by employing the modified acrylic copolymers a-1, a-2, and the unmodified acrylic copolymer A, either trimethylolpropane triacrylate or dipentaerythritol hexaacrylate as compound (b), and 1-hydroxycyclohexyl phenyl ketone as a photopolymerization initiator (c) in the proportions as shown in the TABLE below. Each composition was applied by bar coating onto the decorative surface 23 of a soft film 25B of PMMA having a thickness of 200 μm, and was dried at 60° C. for one minute to form a protective layer 21 having a dry thickness of 10 μm on the decorative film 13A as shown in FIG. 2B, but not having any laminated film 20.

The decorative film 13A which had been subjected to preliminary shaping was placed in a mold as shown in FIG. 4 and an ABS resin was injected into the cavity between the decorative film and the male mold portion 17 to make a support covered with the decorative film. The molded article was exposed to ultraviolet light with an irradiation energy of 2000 mJ/cm$^2$ to have its protective layer 21 cured, with the exception of the article prepared in Comparative Example 4, which was not irradiated. Each article was evaluated for the properties as listed below.

Methods of Evaluation or Tests:

(1) Appearance:

The corners, etc. of each article were visually inspected for any crack.

(2) Solvent resistance:

Each article was immersed in toluene at ordinary room temperature for 30 minutes, then the surface of each article was visually inspected.

(3) Chemical resistance:

On the protective layer of each article was dropped 0.5 ml of a 5% aqueous solution of sodium hydroxide and 0.5 ml of a 5% aqueous solution of sulfuric acid, respectively, and was left 4 hours. Then each solution was wiped away and the surface of the protective layer was visually inspected.

(4) Vickers hardness:

The measurement was conducted by employing an ultralight load micro hardness tester, MXT-50UL, of Matsuzawa Seiki Co., Ltd.

(5) Mar resistance:

After 50 revolutions under a load of 500 g in a Taber abrader, the haze of the protective layer was determined in accordance with the JIS R 3212 method.

|  | Example 1 | Example 2 | Example 3 | Comparative Example 1 | Comparative Example 2 | Comparative Example 3 | Comparative Example 4 | PMMA film |
|---|---|---|---|---|---|---|---|---|
| *1 a-1 | 45 | 55 |  | 35 |  |  | 55 | 500% elongation at 100° C. |
| b-1 |  |  | 50 |  | 70 |  |  |  |
| Unmodified Acrylic copolymer A |  |  |  |  |  | 55 |  |  |
| *2 Trimethylopropane triacrylate | 55 |  |  | 65 |  |  |  |  |
| *2 Dipentaerythritol hexaacrylate |  | 45 | 50 |  | 30 | 45 | 45 |  |
| *3 1-hydroxycyclohexyl phenyl ketone | 4 | 4 | 4 | 4 | 4 | 4 | 4 |  |
| Appearance | Good | Good | Good | Cracked at corner | Good | Good | Good |  |
| Vickers hardness | 18 | 14 | 15 | 20 | 5 | 2 | 2 | 15 |
| Mar resistance: Haze | 7 | 8 | 7 | 5 | 17 | Poor | 28 | 25 |
| Solvent resistance | Good | Good | Good | Good | Rather poor | Poor | Poor |  |
| *4 5% NaOH | Good | Good | Good | Good | Good | Rather poor | Rather poor |  |
| 5% H$_2$SO$_4$ | Good | Good | Good | Good | Good | Rather poor | Rather poor |  |

Comparative Example 4 was equal to Example 2, except that no exposure to ultraviolet light was done.
*1 Compound a
*2 Compound b
*3 Compound c
*4 Chemical resistance Test Results:

The test results are shown in the TABLE. As is evident therefrom, the protective layers formed from the photopolymerizable resin compositions encompassed by the present invention each exhibited excellent solvent and chemical resistances and superb adaptability to conform to the shape of the substrate at every corner thereof.

In Example 3, the protective layer was by far superior in mar resistance (haze) to the PMMA film forming the main body of the decorative film, though they showed an equal value of Vickers hardness. The uncured article of Comparative Example 4 showed the same results in hardness and mar resistance with the cured article of Comparative Example 3. It, therefore, follows that an uncured article is as easy to handle as a cured one.

Although the present invention has been described in detail with reference to its presently preferred embodiments, it will be understood by those of ordinary skill in the art that various modifications and improvements to the present invention are believed to be apparent to one skilled in the art. All such modifications and improvements are intended to be included within the scope of the appended following claims.

What is claimed is:

1. A process of producing a molded article comprising a decorative film and a support, said process comprising the steps of:

preliminarily vacuum shaping the decorative film;

after said vacuum shaping step, introducing the decorative film into a mold cavity, the decorative film being adaptable to conform to a desired shape of the molded article and comprising a protective layer formulated from a photopolymerizable resin composition and a decorative layer, the photopolymerizable resin composition being curable by exposure to light and in an uncured state comprising:

(a) a modified acrylic copolymer including a backbone and at least one (meth)acryloyl side group, said modified acrylic copolymer being synthesized by copolymerizing (i) a glycidyl (meth)acrylate monomer having an epoxy group and (ii) at least one other copolymerizable monomer, and modifying a resulting copolymer with (meth)acrylic acid by reacting the epoxy group with a carboxyl group of the (meth) acrylic acid, the backbone having a glass transition temperature of about 45° C. to about, 80° C. and a weight-average molecular weight of about 30,000 to about 100,000;

(b) a compound other than the modified acrylic copolymer (a), the compound (b) having at least three (meth)acryloyl groups; and (c) a photopolymerization initiator;

forming the support by charging a softened thermoplastic resin into a portion of the mold cavity defined in part by the decorative film; and releasing the molded article from the mold cavity and thereafter curing the photopolymerizable resin composition by exposure to light, wherein the composition contains about 0.1 to about 10 parts by weight of the initiator (c) per 100 parts by weight of the copolymer (a) and the compound (b), and wherein the composition has a weight ratio (a):(b) in a range of about 40:60 to about 60:40.

* * * * *